United States Patent
Bailey et al.

(10) Patent No.: US 6,834,142 B2
(45) Date of Patent: Dec. 21, 2004

(54) OPTICAL GRATING-BASED FILTER

(75) Inventors: Timothy J. Bailey, Longmeadow, MA (US); Martin A. Putnam, Cheshire, CT (US); Jay W. Dawson, Livermore, CA (US); Joseph Pinto, Wallingford, CT (US); James S. Sirkis, Wallingford, CT (US); Paul S. Szczepanek, Middletown, CT (US)

(73) Assignee: CiDRA Corporation, Wallingford, CT (US)

( * ) Notice: Subject to any disclaimer, the term of this patent is extended or adjusted under 35 U.S.C. 154(b) by 0 days.

(21) Appl. No.: 10/098,890

(22) Filed: Mar. 15, 2002

(65) Prior Publication Data

US 2003/0185509 A1 Oct. 2, 2003

Related U.S. Application Data

(63) Continuation-in-part of application No. 09/455,868, filed on Dec. 12, 1999, and a continuation-in-part of application No. 09/455,865, filed on Dec. 6, 1999, which is a continuation-in-part of application No. 09/399,495, filed on Sep. 20, 1999, now abandoned, which is a continuation-in-part of application No. 09/205,943, filed on Dec. 4, 1998, now abandoned, application No. 10/098,890, which is a continuation-in-part of application No. 09/707,084, filed on Nov. 6, 2000, which is a continuation-in-part of application No. 09/691,997, filed on Oct. 19, 2000, which is a continuation-in-part of application No. 09/456,112, filed on Dec. 6, 1999, now Pat. No. 6,229,827, which is a continuation-in-part of application No. 09/400,362, filed on Sep. 20, 1999, now abandoned, which is a continuation-in-part of application No. 09/205,846, filed on Dec. 4, 1998, now abandoned, application No. 10/098,890, which is a continuation-in-part of application No. 09/699,940, filed on Oct. 30, 2000, which is a continuation-in-part of application No. 09/519,240, filed on Mar. 6, 2000.

(60) Provisional application No. 60/276,456, filed on Mar. 16, 2001.

(51) Int. Cl.[7] .............................. G02B 6/02; G02B 6/34
(52) U.S. Cl. .............................. 385/37; 385/13; 385/43

(58) Field of Search .............................. 385/13, 31, 37, 385/39, 43

(56) References Cited

U.S. PATENT DOCUMENTS

| 5,007,705 A | | 4/1991 | Morey et al. |
| 5,388,173 A | | 2/1995 | Glenn |
| 6,104,852 A | | 8/2000 | Kashyap |
| 6,108,470 A | * | 8/2000 | Jin et al. ...................... 385/37 |

(List continued on next page.)

FOREIGN PATENT DOCUMENTS

| EP | 0572169 | 12/1998 |
| EP | 1022595 | 7/2000 |
| WO | WO9722023 | 6/1997 |

(List continued on next page.)

*Primary Examiner*—Rodney Bovernick
*Assistant Examiner*—Omar Rojas (57) ABSTRACT

An optical filter for filtering a spectral profile of an optical signal for providing an output signal having a desire gain profile, such as a flatten gain profile. The filter comprises an optical waveguide that includes a core disposed within a cladding having an outer dimension greater than 0.3 mm. A Bragg grating is imparted or written in the core of the waveguide that attenuates the received optical input signal in accordance with a defined reflection or transmission filter profile. The Bragg grating may be a slanted grating. The filter profile is complementary to the spectral gain profile of the input signal to provide an output signal having a substantially flat spectral profile of a desired wavelength band. The cladding of the waveguide may have a mechanically advantageous outer geometry (e.g., a "dogbone" shape) for allowing an axial compressive force to tune the Bragg grating. The waveguide may be package within an athermal device, which tunes the grating to compensate for temperature dependent changes. Further, the waveguide may be packaged in a tuning device to selective tune the gratings to shift the center wavelength of the spectral profile of the filter, or to change the shape of the filter profile.

41 Claims, 6 Drawing Sheets

U.S. PATENT DOCUMENTS

| | | | |
|---|---|---|---|
| 6,301,408 B1 * | 10/2001 | Espindola et al. | 385/37 |
| 6,301,410 B1 * | 10/2001 | Carberry et al. | 385/37 |
| 6,304,696 B1 * | 10/2001 | Patterson et al. | 385/37 |
| 6,490,078 B2 * | 12/2002 | Enomoto et al. | 359/341.1 |
| 6,763,043 B2 * | 7/2004 | Putnam et al. | 372/6 |
| 6,768,825 B2 * | 7/2004 | Maron et al. | 385/13 |

FOREIGN PATENT DOCUMENTS

| | | |
|---|---|---|
| WO | WO0037969 | 6/2000 |
| WO | WO0039617 | 7/2000 |
| WO | WO0072059 | 11/2000 |

\* cited by examiner

OPTICAL GRATING-BASED FILTER

CROSS-REFERENCE TO RELATED APPLICATIONS

This application is a continuation-in-part of U.S. patent application Ser. No. 09/455,868, filed Dec. 12, 1999; a continuation-in-part of U.S. patent application Ser. No. 09/455,865, filed Dec. 6, 1999, which is a continuation-in-part of U.S. patent application Ser. No. 09/399,495, filed Sep. 20, 1999, now abandoned, which is continuation in part of U.S. patent application Ser. No. 09/205,943, filed Dec. 4, 1998, now abandoned; a continuation-in-part of U.S. application Ser. No. 09/707,084, filed Nov. 6, 2000, which is a continuation-in-part of U.S. patent application Ser. No. 09/691,997, filed Oct. 19, 2000, which is continuation of U.S. patent application Ser. No. 09/4456,112, filed Dec. 6, 1999, now granted (U.S. Pat. No. 6,229,827), which is a continuation-in-part of U.S. patent application Ser. No. 09/400,362 filed Sept. 20, 1999, now abandoned, which is a continuation-in-part of U.S. patent application Ser. No. 09/205,846, filed Dec. 4, 1998, now abandoned; a continuation-in-part of U.S. application Ser. No. 09/699,940, filed Oct. 30, 2000, which is a continuation-in-part of U.S. patent application Ser. No. 09/519,240, filed Mar. 6, 2000; and claims the benefit of U.S. Provisional Application No. 60/276,456, filed Mar. 16, 2001, all of which are incorporated herein by reference in their entirety.

TECHNICAL FIELD

The present invention generally relates to an optical filter and, more particularly, to a grating-based optical filter for attenuating the amplitude of an optical signal to provide a desired spectral profile.

BACKGROUND ART

Optical amplifiers continue to be the catalyst of the rapid growth of all optical networks. With dynamic reconfigurability looming on the near term horizon, the performance demands on amplifiers will become even more stringent. In the simplest of the amplifier designs where the amplifier gain is attenuated by one of a variety of techniques, the gain is not constant throughout the spectrum but has a specific profile determined by the operating conditions. This non-uniform gain spectra leads to non-uniformity in the optical signal powers in dense wave division multiplexing (DWDM) channels, which, left unchecked, can result in an increased signal-to-noise ratio, bit error ratio, or channel loss in the optical amplifier signal.

As known, gain equalization filters are used to selectively attenuate an optical signal to compensate for the gain variations produced by the amplifier, and thereby flatten the amplifier gain spectra. A variety of technologies have been proposed, including those based on arrays of microelectro-mechanical systems (MEMS) cantilevered beams and/or mirrors, Faraday rotation elements, long period fiber gratings, thermally controlled array waveguides (AWGs), LCD technology, and acousto-optic tunable filters. Long period fiber gratings typically couple light from a core mode to a cladding mode and have a grating period of 10–100 times greater than a short period grating (which may typically be 1 micron).

Some disadvantages of these technologies include the fact that long period fiber gratings result in a long device, which are cumbersome to compensate for temperature. Other devices involve sensitive free space optical path and bulk optic elements, all of which are extremely alignment sensitive, thermally unstable and bulky. Furthermore, most of these technologies do not take into consideration the wavelength shifts in the gain spectra due to temperature changes and other factors.

In addition, it has long been thought that slanted or "blazed" Bragg gratings would make ideal gain flattening filters because the blazed Bragg gratings can, in principle, be designed to provide wavelength dependant loss, like a thin film filter, but without the back reflections common in conventional Bragg gratings. It has been said that the use of these gratings in a product would be considered disruptive, because one would get the best of both worlds, the performance of Bragg gratings, but with the reflection suppression qualities of thin film filters. Another key advantage of Braggs over thin films is the speed with which new designs can be turned around.

In a paper *"New and efficient technique for the suppressing the peaks induced by discrete cladding mode coupling in fiber slanted Bragg grating spectrum"*, which is incorporated herein by reference, the author describes a method for overcoming a significant technical constraint of the technology, which is the coupling to discrete cladding modes. Because the author's experiments were conducted in fiber, where the cladding diameter is 125-micron, there were a finite number of cladding modes, which interfered to form a series of peaks in loss spectrum, which is very undesirable. The paper explains that the best way to circumvent this issue is to surround the fiber with an "infinite" index-matched medium, which results in a continuum of cladding modes and therefore a smooth loss spectrum. Materials that were cited, include, polymers and oil. However, the long-term reliability of such materials could not be verified.

Consequently, two alternative solutions were proposed, chirping the grating or making the grating short. Each of these techniques is designed to cause the cladding modes to smear into each other so as to prevent ripple in the loss spectrum. These solutions, however, come at a cost. In the case of the chirped grating, one may lose the ability to write a sufficiently sharp spectral profile because the grating must necessarily be broadened to prevent the cladding modes. In the case of shortening the grating, one makes two sacrifices. Shorter gratings have broader spectral profiles, and again one may give up the possibility of writing sufficiently sharp gratings. Also, and probably the most significant sacrifice, is that shorter gratings require much larger index changes to achieve the same loss values. The paper illustrates 0.7 mm long gratings, which for many applications would not allow for a sufficiently strong grating with the sort of index modulations that are achievable with conventional writing and hydrogen loading techniques.

Thus, it is advantageous and desirable to provide an optical filter for flattening the gain of an optical signal, which overcomes these disadvantages.

SUMMARY OF THE INVENTION

An object of the present invention is to provide an optical filter, including an optical waveguide with a reflective elements disposed therein, for altering the spectral profile of an optical signal to a desired gain profile (e.g. a flattened gain profile), wherein optical waveguide has characteristic that permit the spectral profile of the optical filter to be altered.

In accordance with an embodiment of the present invention, an optical filter comprises an optical waveguide that includes an outer cladding having a core disposed therein. The waveguide has an outer waveguide dimension of the waveguide is greater than 0.3 mm. A slanted grating is imparted in the waveguide for selectively attenuating a received optical input signal to provide an optical output signal having a desire spectral gain profile.

In accordance with an embodiment of the present invention, an optical filter comprises an optical waveguide that includes an outer cladding with a core disposed therein. The waveguide has an outer waveguide dimension of the waveguide is greater than 0.3 mm. A reflective element is imparted in the core of the waveguide for selectively attenuating a received optical input signal to provide an optical output signal having a desire spectral gain profile.

In accordance with an embodiment of the present invention, an optical device comprises an optical waveguide having an outer cladding with a core disposed therein. An outer waveguide dimension of the waveguide is greater than 0.3 mm. A reflective element is disposed in the waveguide to minimize back reflection.

The foregoing and other objects, features and advantages of the present invention will become more apparent in light of the following detailed description of exemplary embodiments thereof.

BEST MODE FOR CARRYING OUT THE INVENTION

Figure 1:
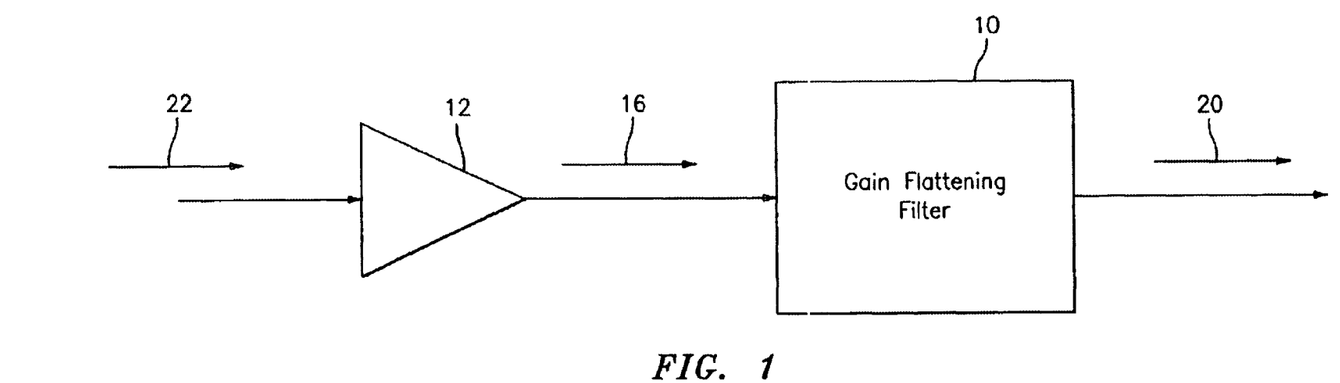
FIG. 1 is a block diagram of an optical amplifier optically coupled to a gain flattening filter (GFF) functioning in a transmission mode, according to the present invention.
Figure 3:
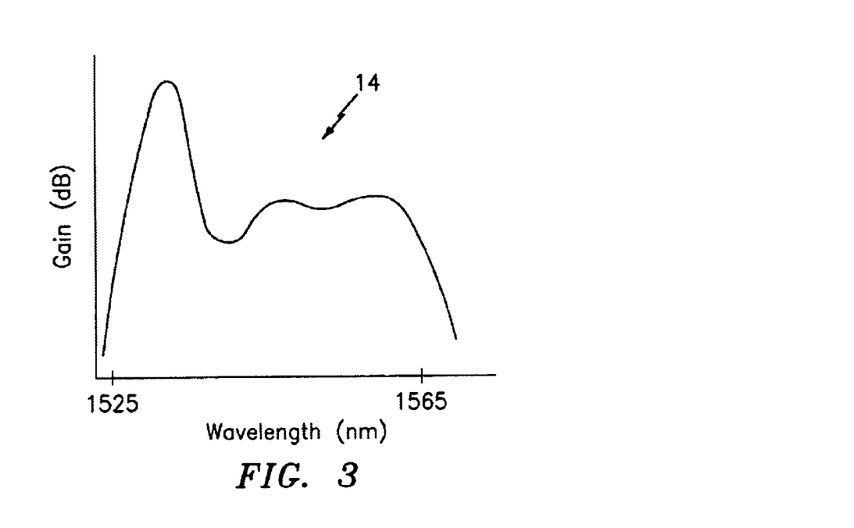
FIG. 3 is a plot showing a spectral gain profile of an amplified optical signal provided at the output of an optical amplifier.
Figure 5:
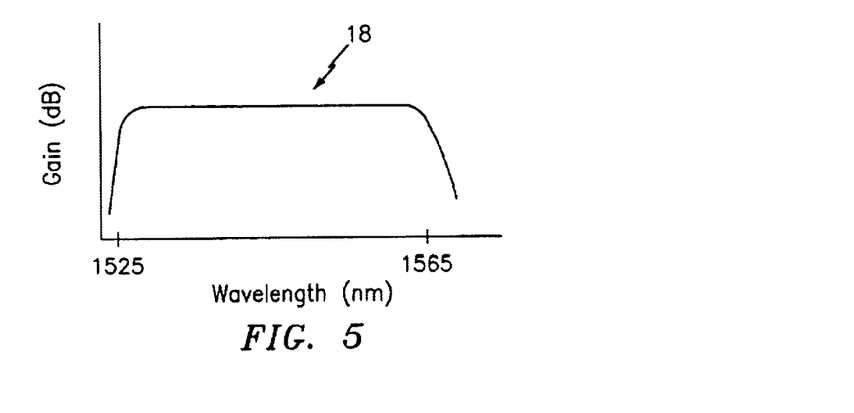
FIG. 5 is a plot showing a spectral gain profile of an output optical signal from the gain flattening filter embodying the present invention.

Referring to FIG. 1, an optical gain flattening filter (GFF), generally shown as 10, is optically coupled to the output of an optical amplifier 12, such as an Erbium-doped fiber amplifier (EDFA). As known in the art, an EDFA or other optical amplifiers have a gain profile that varies over a predetermined wavelength band, i.e., the "C" and/or "L" bands. For instance, FIG. 3 is illustrative of the gain profile 14 an amplified signal 16 provided by 30 an EDFA over the "C" band. The gain flattening filter 10 attenuates the amplified signal 16, provided by the amplifier 12, over a predetermined wavelength band to provide a generally flat spectral profile 18 of the output signal 20 as shown in FIG. 5. As shown in FIG. 1, the GFF 10 may function in a transmission mode to selectively attenuate the amplified signal 16 over the desired wavelength band.

Figure 4:
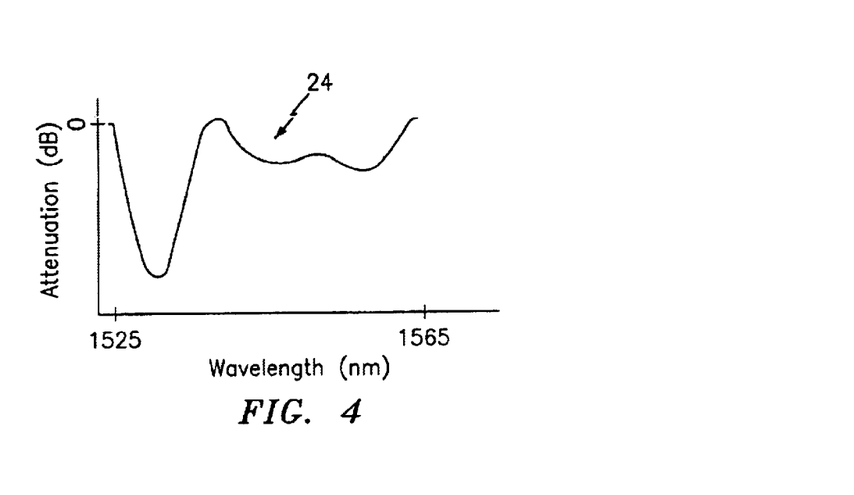
FIG. 4 is a plot showing a transmission or reflection filter profile of a gain flattening filter, in accordance with the present invention.

In operation of the gain flattening filter of FIG. 1, an optical input signal 22 is provided to the optical amplifier 12, which amplifies the input signal in accordance with a predetermined gain profile 14 to provide the amplified signal 16 having a spectral profile 14, as shown in FIG. 3 for example. The gain profile 14 of the optical amplifier 12 can be decomposed into one or more Fourier components. The GFF 10 attenuates one or more spectral peaks of the amplifier gain profile 14 in accordance with the transmission profile 24 of the GFF 10, as shown in FIG. 4. As shown in FIGS. 3 and 4, the attenuation of the GFF 10 defined by the transmission profile 24 is complementary to the amplifier gain profile 14 to provide an output signal 20 of the GFF 10 having a flattened gain profile 18 as shown in FIG. 5.

Figure 2:
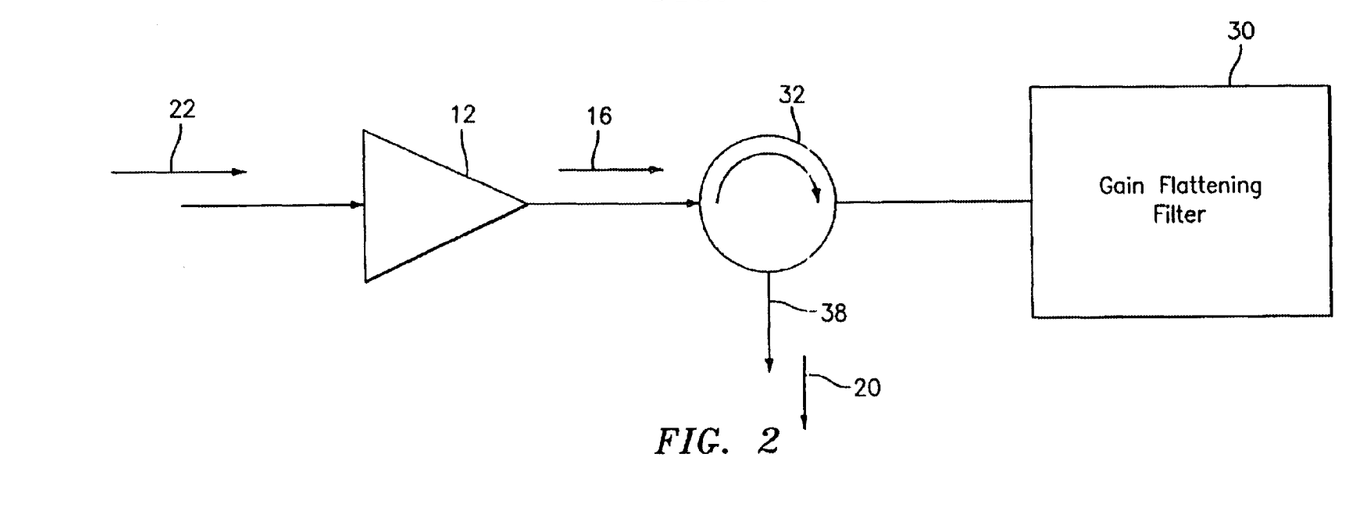
FIG. 2 is a block diagram of an optical amplifier optically coupled to a gain flattening filter functioning in a reflection mode, according to the present invention.

FIG. 2 illustrates another embodiment of the GFF 30 of the present invention, wherein the GFF operates in a reflection mode. As shown, the optical input signal 22 is amplified by amplifier 12 and provided to an optical directing device 32, such as a 3-port optical circulator having ports 34, 35 and 36. The amplified signal 16 is received by port 34 and directed in a clockwise direction to the second port 35 to the GFF 30. The GFF 30 attenuates the amplified signal 16 according to the attenuation profile shown in FIG. 4, which is representative of the reflection profile of the GFF 30. The resulting output signal 20 is reflected back to port 35 of the circulator 32, which directs the output signal to port 36 and light conduit 38.

Figure 6:
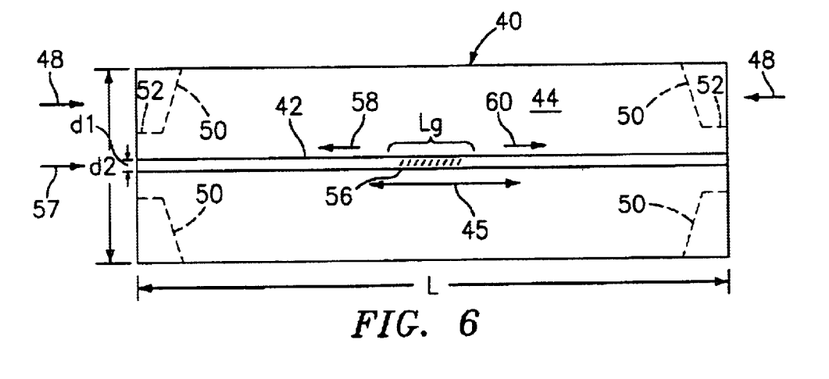
FIG. 6 is a side view of an optical waveguide including a Bragg grating written therein of a gain flattening filter, in accordance with the present invention.

Referring to FIG. 6, the GFFs 10,30 comprise a large diameter optical waveguide 40 that has at least one core 42 surrounded by a cladding 44, similar to that disclosed in co-pending U.S. patent application, Ser. No. 09/455,868 entitled "Large Diameter Optical Waveguide, Grating, and Laser", which is incorporated herein by reference. The waveguide 40 comprises silica glass (SiO$_2$) based material having the appropriate dopants, as is known, to allow light 45 to propagate in either direction along the core 42 and/or within the waveguide 40. The core 42 has an outer dimension d1 and the waveguide 40 has an outer dimension d2. Other materials for the optical waveguide 40 may be used if desired. For example, the waveguide 40 may be made of any glass, e.g., silica, phosphate glass, or other glasses; or solely plastic.

The outer dimension d2 of the cladding 44 is at least about 0.3 mm; and the outer dimension d1 of the core 12 is such that it propagates only a few spatial modes (e.g., less than about 6). For example for single spatial mode propagation, the core 42 has a substantially circular transverse cross-sectional shape with a diameter d1 less than about 12.5 microns, depending on the wavelength of light. The invention will also work with larger or non-circular cores that propagate a few (less than about 6) spatial modes, in one or more transverse directions. The outer diameter d2 of the cladding 44 and the length L have values that will resist buckling when the waveguide 40 is placed in axial compression as indicated by the arrows 48.

The waveguide 40 may be ground or etched to provide tapered (or beveled or angled) outer corners or edges 50 to provide a seat for the waveguide 40 to mate with another part (not shown) and/or to adjust the force angles on the waveguide 10, or for other reasons. The angle of the beveled corners 50 is set to achieve the desired function. Further, the waveguide may be etched or ground to provide nubs 52 for an attachment of a pigtail assembly (54) (see FIG. 7) to the waveguide 40. Further, the size of the waveguide 40 has inherent mechanical rigidity that improves packaging options and reduces bend losses.

The waveguide 40 has an aperiodic Bragg grating 56 impressed (or embedded or imprinted) therein. A Bragg grating 56, as is known, is a periodic or aperiodic variation in the effective refractive index and/or effective optical absorption coefficient of an optical waveguide, such as that described in U.S. Pat. Nos. 4,725,110 and 4,807,950, entitled "Method for Impressing Gratings Within Fiber Optics", to Glenn et al; and U.S. Pat. No. 5,388,173, entitled "Method and Apparatus for Forming Aperiodic Gratings in Optical Fibers", to Glenn, which are hereby incorporated by reference to the extent necessary to understand the present invention. The grating 56 may be in the core 42 and/or in the cladding 44 (not shown). Any wavelength-tunable grating or reflective element embedded, etched, imprinted, or otherwise formed in the waveguide 40 may be used if desired. The waveguide 40 may be photosensitive if a grating 56 is to be written into the waveguide 40. As used herein, the term "grating" means any of such reflective elements. Further, the reflective element (or grating) 56 may be used in reflection and/or transmission of light. Light 57 incident on the grating 56 reflects a portion thereof as indicated by a line 58, and passes the remaining incident light 57 (within a predetermined wavelength range), as indicated by a line 60 (as is known).

The grating 56 has a grating length Lg, which is determined based on the application, may be any desired length. A typical grating 16 has a grating length Lg in the range of about 3–40 mm. Other sizes or ranges may be used if desired. The length Lg of the grating 56 may be shorter than or substantially the same length as the length L of the waveguide 40. Also, the core 42 need not be located in the center of the waveguide 40 but may be located anywhere in the waveguide 40.

Accordingly, we have found that an outer diameter d2 of greater than about 400 microns (0.4 mm) provides acceptable results (without buckling) for a waveguide length L of 5 mm, over a grating wavelength tuning range of about 10 nm. For a given outer diameter d2, as the length L increases, the wavelength tuning range (without buckling) decreases. Other diameters d2 for the waveguide 40, may be used depending on the overall length L of the waveguide 40 and the desired amount of compression length change ΔL or wavelength shift αλ.

The waveguide 40 may be made using fiber drawing techniques now known or later developed that provide the resultant desired dimensions for the core and the outer diameter discussed hereinbefore. As such, the external surface of the waveguide 40 will likely be optically flat, thereby allowing Bragg gratings to be written through the cladding similar to that which is done for conventional optical fiber. Because the waveguide 40 has a large outer diameter compared to that of a standard optical fiber (e.g., 125 microns), the waveguide 40 may not need to be coated with a buffer and then stripped to write the gratings, thereby requiring less steps than that needed for conventional optical fiber gratings. Also, the large outer diameter d2 of the waveguide 40, allows the waveguide to be ground, etched or machined while retaining the mechanical strength of the waveguide 40. Thus, the present invention is easily manufacturable and easy to handle. Also, the waveguide 40 may be made in long lengths (on the order of many inches, feet, or meters) then cut to size as needed for the desired application.

Also, the waveguide 40 does not exhibit mechanical degradation from surface ablation common with optical fibers under high laser fluency (or power or intensity) during grating exposure (or writing). In particular, the thickness of the cladding between the cladding outer diameter and the core outer diameter causes a reduced power level at the air-to-glass interface for a focused writing beam.

We have also found that the present invention also reduces coupling between the core and cladding modes due to the increased end cross-sectional area between the core and cladding of the waveguide. Thus, a grating 56 written in the core 42 of the waveguide 40 exhibits less optical transmission loss and a exhibits a cleaner optical profile than a conventional fiber grating because the large cladding region dissipates coupled cladding modes, thereby reducing the coupling of the core 42 to the cladding 44 modes. In general, the greater the difference in cross-sectional area between the core 42 and the cladding 44 the smaller the mode field overlap and the lower the coupling to the cladding modes. The thickness of the cladding 44 between the cladding outer diameter and the core outer diameter may be set to optimize this effect. Other diameters of the core 42 and waveguide 40 may be used if desired such that the cladding modes are reduced to the desired levels.

The waveguide 40 may have end cross-sectional shapes other than circular, such as square, rectangular, elliptical, clam-shell, octagonal, multi-sided, or any other desired shapes, discussed more hereinafter. Also, the waveguide may resemble a short "block" type or a longer "cane" type geometry, depending on the length of the waveguide and outer dimension of the waveguide.

Figure 7:
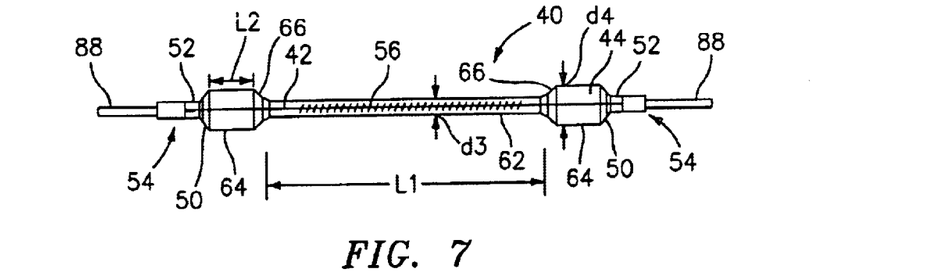
FIG. 7 is a side view of another embodiment of an optical waveguide including a Bragg grating written therein of a gain flattening filter, in accordance with the present invention.

Referring to FIG. 7, the side cross-section of the outer surface of the waveguide 40 may have a varying geometry, depending on the application. For example, the waveguide 40 may have a "dogbone" shape having a narrow central section 62 (having an outer diameter d3 of at least 0.3 mm) and larger outer sections 64. The dogbone shape may be used to provide increased sensitivity in converting axial force to length change ΔL and/or wavelength shift Δλ of the grating 56 and may be achieved by etching, grinding, machining, heating & stretching, or other known techniques.

In one embodiment of the present invention, the central section 62 may have an outer diameter d3 of about 0.8–1 mm, and a length L of about 5–20 mm. The outer sections 164 each have a diameter d4 of about 3 mm and a length L2 of about 2–5 mm. The overall length L1 is about 10–30 mm and the multi-component grating has a length Lg of about 5–20 mm. Other lengths and diameters of the sections 62, 64 may be used. Other dimensions and lengths for the grating element 40 and the multi-component grating may be used.

An inner transition region 66 of the outer sections 64 may be a sharp vertical or angled edge or may be curved. A curved geometry has less stress risers than a sharp edge and thus may reduce the likelihood of breakage. Further, the outer sections 64 may have tapered (or beveled) outer comers 50.

We have found that such a dimension change between the dimension d4 of the outer sections 64 and the dimension d3 of the central section 62 provides increased force to grating wavelength shift sensitivity (or gain or scale factor) by strain amplification. Also, the dimensions provided herein for the dogbone are easily scalable to provide the desired amount of sensitivity.

The dimensions and geometries for any of the embodiments described herein are merely for illustrative purposes and, as such, any other dimensions may be used if desired, depending on the application, size, performance, manufacturing requirements, or other factors, in view of the teachings herein.

The angle of the beveled comers 50 is set to achieve the desired function. In addition, one or both of the axial ends of the waveguide 40 where the pigtail assembly 54 attaches may have an outer tapered (or fluted, conical, or nipple) axial section 52.

Alternatively, the optical waveguide 40 may be formed by heating, collapsing and fusing a glass capillary tube to a fiber (not shown) by a laser, filament, flame, etc., as is described in copending U.S. patent application, Ser. No. 09/455,865, entitled "Tube-Encased Fiber Grating", which is incorporated herein by reference. Other techniques may be used for collapsing and fusing the tubes to the fiber, such as is discussed in U.S. Pat. No. 5,745,626, entitled "Method For And Encapsulation Of An Optical Fiber", to Duck et al., and/or U.S. Pat. No. 4,915,467, entitled "Method of Making Fiber Coupler Having Integral Precision Connection Wells", to Berkey, which are incorporated herein by reference to the extent necessary to understand the present invention, or other techniques. Alternatively, other techniques may be used to fuse the fiber to the tube, such as using a high temperature glass solder, e.g., a silica solder (powder or solid), such that the fiber, the tube and the solder all become fused to each other, or using laser welding/fusing or other fusing techniques.

The Bragg grating 56 may be written in the core 42 before or after the capillary tube is encased around and fused to the fiber, such as is discussed in copending U.S. Patent Application, Serial No. (CiDRA Docket No. CC-0078), which is incorporated herein by reference. If the grating 56 is written in the fiber after the tube is encased around the grating, the grating may be written through the tube into the fiber by any desired technique, such as is described in copending U.S. patent application, Ser. No. 09/205,845 (CiDRA Docket No. CC-0130), entitled "Method and Apparatus For Forming A Tube-Encased Bragg Grating", filed Dec. 4, 1998, which is incorporated herein by reference.

It is well known that the center wavelength at which a Bragg grating reflects may shift up or down due to the expansion or contraction of the waveguide 40, in response to the changes in temperature or other environmental factors. Thus, it is desirable to provide a tuning mechanism to compensate for the spectral shift spectral filter profile 24 (see FIG. 4) due to change in temperature.

Figure 8:
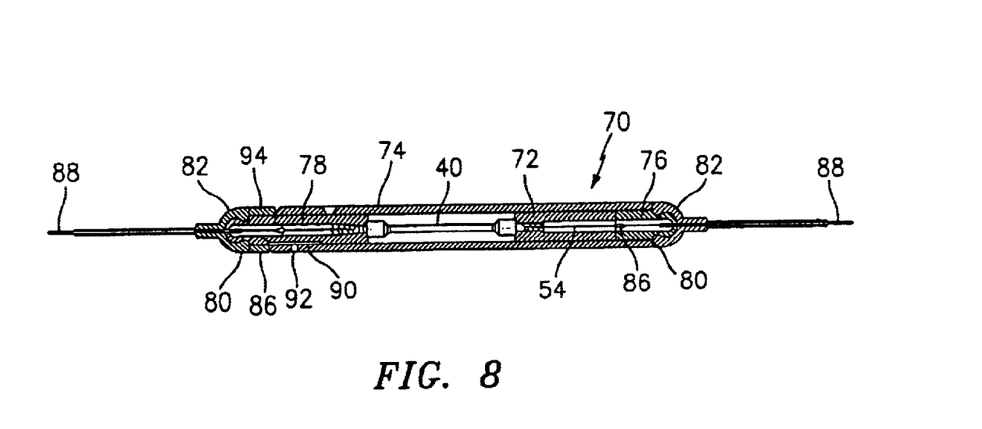
FIG. 8 is a cross-sectional view of an athermal gain flattening filter in accordance with the present invention.

Referring to FIG. 8, an athermal device 70 is shown for compression-tuning the waveguide 40 to compensate for changes in temperature, which is similar to the athermal device described in U.S. patent application Ser. No. 09/699,940 (Our Docket No. CC-0234A), entitled "Temperature Compensated Optical Device", which is incorporated herein by reference. The athermal device 70 includes the optical waveguide 40, attached pigtail assemblies 54, and a compensating spacer or rod 72, disposed in a tubular housing 74 formed of a high strength metal or metal alloy material, preferably having a low CTE that is higher than silica.

A fixed end cap 76 and an adjustable end cap 78, which are formed of similar material as the housing are welded in respective ends of the housing 74 to secure and maintain in axial alignment the optical waveguide and compensating spacer 72. Both the fixed end cap 76 and the adjustable end cap 78 extend outward from the end of the housing 74, and include a circumferential groove 80 for receiving a respective strain relief boot 82. Further, the fixed end cap 76 and the adjustable end cap 78 include a bore for receiving a respective strain relief device 86 and for passing the optical fiber 88 of the pigtail assemblies 54 therethrough.

The compensating spacer or rod 72 is disposed between the fixed end cap 76 and the optical waveguide 40. The spacer 72 includes a stepped bore disposed axially for receiving the pigtail assembly 54 therethrough. The stepped bore has a diameter greater than the inner portion of the bore of the spacer to assure that no contact occurs between the spacer and the fiber during expansion and contraction of the athermal device 70.

The spacer 72 is formed of a metal or metal alloy, such as steel, stainless steel, aluminum, high expansion alloy. The CTEs and lengths of the optical waveguide 40, the end caps 76,78 and the spacer 72 are selected such that the reflection wavelength of the grating 56 does not substantially change over a predetermined temperature range (i.e., 100° C.). More specifically, the length of the spacer 72 is sized to offset the upward grating wavelength shift due to temperature and the thermal expansion of the housing, waveguide and end caps. As the temperature increases, the spacer length expands faster than the optical waveguide, which shifts the grating wavelength down to balance the intrinsic wavelength shift up with increasing temperature. The length of the adjustable end cap is longer than the fixed end cap 76.

Additionally, a pair of planar surfaces 90 are ground or formed in the outer surface of the adjustable end cap 78 to maintain the adjustable end cap in a fixed rotational orientation to the housing 74 and optical waveguide 40, during adjustment and mechanical bum-in process. The planar surfaces 90 are spaced radially at a predetermined angle (e.g., 120 degrees) and extend axially a predetermined length (i.e., 0.290 in.) to permit axial movement while maintaining the adjustable end cap 78 rotationally fixed. The planar surface align with a pair of holes 92 disposed in the housing 74, which are radially spaced 120 degrees. The holes 92 in the housing 74 receive a pair of spring loaded pins (not shown), which are disposed within a collar (not shown) mounted on the outer surface of the housing during assembly. The pins extend through the holes 92 to engage the planar surfaces 90 of the adjustable end cap 78, while the collar temporarily clamps the housing to the adjustable end cap, before being welded to the housing 74.

To complete the assembly of the athermal device 70, a ring 94, having a width substantially equal to the distance between the end of the housing 74 and the strain relief boot 82, is placed over the adjustable end cap 78. The strain relief boots 82, which are formed of a polymer (e.g., Santoprene), are then snap fit into respective grooves 80 of the end caps 76, 78.

Figures 9, 10:
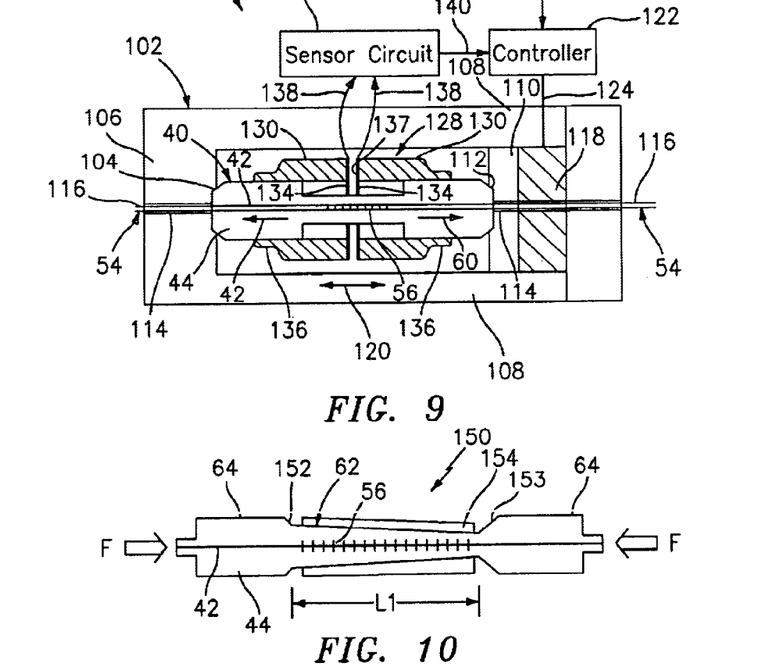
FIG. 9 is a side view of a tunable gain flattening filter and a block diagram of a positional/force feedback control circuit in accordance with the present invention.
FIG. 10 is a side view of another embodiment of an optical waveguide of a gain flattening filter including a Bragg grating written therein, in accordance with the present invention.

The GFF 10 may also comprise a tuning device 100 that compresses axially the optical waveguide 40 using a non-optical closed control loop to change or adjust the center wavelength of the filter profile of the GFF 10. The tuning device 100 is similar to that disclosed in co-pending U.S. patent application, Ser. No. 09/707,084 entitled "Compression-Tuned Bragg Grating and Laser", and co-pending U.S. patent application, Ser. No. 09/455,868 entitled "Large Diameter Optical Waveguide, Grating, and Laser", which are incorporated herein by reference in their entirety.

The tuning device 100 compresses axially the optical waveguide 40 within a housing 102. One end of the optical waveguide 40 is pressed against a seat 104 in one end 106 of the housing 102. The housing also has a pair of arms (or sides) 108, which guide a movable block 110. The block 110 has a seat 112 that presses against the other end of the waveguide 40. The axial end faces of the waveguide 40 and/or the seats on mating surfaces 104, 112 may be plated with a material that reduces stresses or enhances the mating of the waveguide 40 with the seat on the mating surfaces. The ends of the housing 102 and the block 110 have a bore 114 drilled through them to allow the fiber 116 to pass therethrough. Instead of the recessed seats 104,112, the end 106 of the housing 102 and the block 110 may provide a planar surface for engaging flush with the respective ends of the waveguide 40.

The housing 102 may be assembled such that a pre-strain or no pre-strain exists on the waveguide 40 prior to applying any outside forces.

An actuator 118, such as a piezoelectric actuator, engages the moveable block 110, which causes the block to move as indicated by arrows 120. Accordingly, the PZT actuator 118 provides a predetermined amount of force to the moving block 110 to compress the waveguide 40, and thereby tune the grating 56 to a desired reflection wavelength. In response to control signal generated by a displacement control circuit or controller 122 via conductor 124, the PZT actuator 118 is energized to provide the appropriate compression force necessary to tune the grating element to the desired Bragg reflection wavelength of the grating 56. The control circuit 122 adjusts the expansion and retraction of the actuator 118 in response to an input command 126 and a displacement sensor 128 that provides feedback representative of the strain or compression of the waveguide 40 to form a non-optical closed-loop control configuration. In other words, light 57 propagating through the network or device is not used to provide feedback for the tuning of the grating 56.

In one embodiment, the displacement sensor 128 includes a pair of capacitive elements 130 and a known displacement sensor circuit 132, similar to that disclosed in copending U.S. patent application, Ser. No. 09/519,802 entitled, "Tunable Optical Structure Featuring Feedback Control", filed Mar. 6, 2000, which is incorporated by reference in its entirety. As shown in FIG. 9, each capacitive element 130 is generally tubular having an annular capacitive end surface 134. The capacitive elements may be formed of glass, plastic or other material. The capacitive elements 130 are mounted, such as welding or epoxy, to respective ends of the waveguide 40 at 136 such that the capacitive surfaces 134 are spaced a predetermined distance apart, for example, approximately 1–2 microns. Other spacings may be used if desired. The capacitive elements 130 may be bonded or secured using an epoxy or other adhesive compound, or fused to waveguide 40 using a $CO_2$ laser or other heating element. The capacitive surfaces 134 are coated with a metallic coating, such as gold, to form a pair of annular capacitive plates 137. The change in capacitance depends on the change in the spacing between the capacitive plates.

Electrodes 138 are attached to the capacitive plates 137 to connect the capacitor to the displacement sensor circuit 132. The sensor circuit 132 measures the capacitance between the capacitive plates 136; and provides a sensed signal 140, indicative of the measured capacitance, to the displacement controller 122. As the waveguide 40 is strained, the gap between the parallel capacitive plates 136 will vary, thereby causing the capacitance to change correspondingly. Specifically, as the grating is compressed, the gap between the capacitive plates 136 is reduced, resulting in an increase in capacitance. The change in capacitance is inversely proportional to the change in the reflection wavelength $\lambda_b$ of the grating 56. Since the capacitive elements 130 are directly connected to the waveguide 40, the capacitive elements are passive and will not slip. One skilled in the art would be able to implement without undue experimentation, the sensor electronics circuit 132 to measure the change in capacitance between the two capacitive plates 137.

In the operation of the tuning device 100, the controller 122 receives the wavelength input signal 126, which represents the desired reflection wavelength to tune the grating unit. In response to the input signal 126 and the sensed signal 140, which is representative of the present reflection wavelength of the grating 56, the controller 122 provides a control signal 124 to the actuator 118 to increase or decrease the compression force applied to the waveguide 40 to set the desired reflection wavelength of the grating 56. The change in applied force to the waveguide 40 changes the spacing between the ends of the grating 56, and therefore, the spacing between the capacitive plates 137. As described above, the change in spacing of the capacitive plates 136 changes the capacitance therebetween provided to the sensor circuit 132, which provides displacement feedback to the controller 122. While the sensor circuit 132 and the controller 122 has been shown as two separate components, one would recognize that the functions of these components may be combined into a single component. One example of a closed loop actuator 118 that may be used is Model No. CM (controller) and DPT-C-M (for a cylindrical actuator) made by Queensgate, Inc. of N.Y.

Although the invention has been described with respect to using a capacitor 128 to measure the gap distance, it should be understood by those skilled in the art that other gap sensing techniques may be used, such as inductive, optical, magnetic, microwave, time-of-flight based gap sensors, as described in pending U.S. patent application Ser. No. 09/950,5010 entitled "Tunable Optical Structure Featuring Feedback Control", which is incorporate herein by reference. Moreover, the scope of the invention is also intended to include measuring or sensing a force applied on or about the compressive element, and feeding it back to control the compression tuning of the optical structure. While the embodiment of the present invention described hereinbefore includes means to provide feedback of the displacement of a waveguide 40, one should recognize that the tuning devices may be accurately and repeatably compressed and thus may operate in an open loop mode.

Alternatively, instead of using a piezoelectric actuator 118, the waveguide 40 may be compressed by another actuator, such as a solenoid, pneumatic force actuator, or any other device that is capable of directly or indirectly applying an axial compressive force on the waveguide 40. Further, a stepper motor or other type of motor whose rotation or position can be controlled may be used to compress the waveguide. A mechanical linkage connects the motor, e.g., a screw drive, linear actuator, gears, and/or a cam, to the movable block 110 (or piston), which cause the block to move as indicated by arrows 120, similar to that described in pending U.S. patent application Ser. No. 09/751,589 entitled "Wide Range Tunable Optical Filter", filed Dec. 29, 2000 (CC-0274A); and U.S. patent application Ser. No. 09/752,332 entitled "Actuator Mechanism for Tuning an Optical Device", filed Dec. 29, 2000. (CC-0322), which are incorporated herein by reference. The stepper motor may be a high resolution stepper motor driven in a microstepping mode, such as that described in the aforementioned U.S. Pat. No. 5,469,520, "Compression Tuned Fiber Grating", to Morey et al, (e.g., a Melles Griot NANOMOVER), incorporated herein by reference.

Alternatively, the grating may be tuned by mechanically stressing (i.e. tension, bending) the grating elements, or varying the temperature of the grating (i.e., using a heater), such as that described in U.S. Pat. No. 5,007,705, entitled "Variable Optical Fiber Bragg Filter Arrangement", to Morey et al., which is incorporated herein by reference.

It should be noted that the waveguide 40, as shown in FIG. 7, has a narrow central section 62, as compared to the two wider outer sections 64. With the arrangement as shown in FIG. 7, when an axial, compressive force F is exerted at the ends of the waveguide 40, the axial force applied to the central section 62 is magnified by the mechanical advantage provided by the geometry of the cladding 44. More specifically, the axial force exerted onto the central section 62 is effectively magnified by a factor substantially equal to the ratio of the cross-section of the outer sections 64 to the cross section of the central section 62. This geometry renders it practical to compression-tune the Bragg grating gain filter with high precision. If the cross-section of the central section 62 of the waveguide 40 is uniform throughout the central section containing the Bragg grating(s) 56, then the shape of the filter profile 24 (see FIG. 4) of the GFF 10 will remain substantially the same while the central wavelength (or reflection wavelength $\lambda_B$) of the filter profile shifts.

Figure 11:
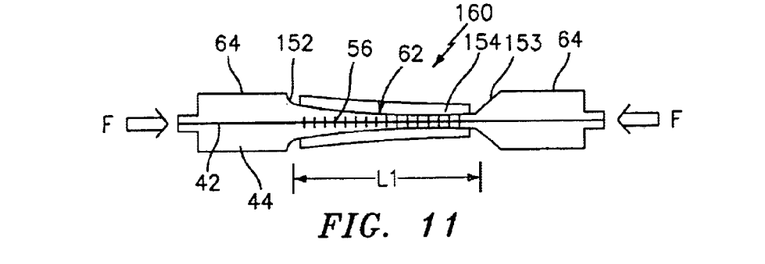
FIG. 11 is a side view of another embodiment of an optical waveguide of a gain flattening filter including a Bragg grating written therein, in accordance with the present invention.
Figure 12:
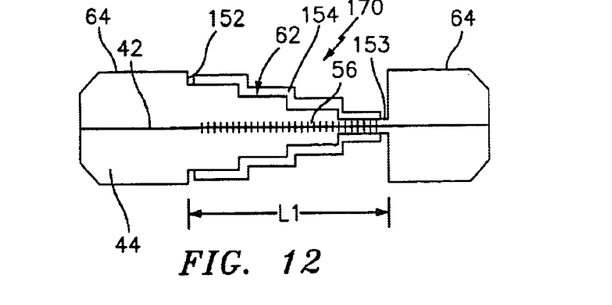
FIG. 12 is a side view of another embodiment of an optical waveguide of a gain flattening filter including a Bragg grating written therein, in accordance with the present invention.

In some occasions, however, it may be desirable to change statically or dynamically the shape of the filter profile 24 of the GFF 10. As shown in FIGS. 10–12, this may be accomplished by varying the cross-sectional area of the central section of the waveguide 150, 160, 170 along its length L1.

In FIG. 10, for example, the central portion 62 of a waveguide 150 may be linearly tapered, such that a first end 152 of the central section 62 is wider than a second end 153. Accordingly, when the waveguide 150 is compressed by an axial force F, the grating 56 is linearly chirped, and thereby changes the shape of the filter profile 24 (FIG. 4) of the grating 150, accordingly. Additionally, a thermal device 154 (e.g., heater TEC or any heating or cooling device) may be wrapped around the central section 62 of the waveguide 150 to tune the center wavelength of the grating 56 along a spectral range.

Further in FIG. 11, the central portion 62 of the waveguide 160 may be quadradically tapered, such that a first end 152 of the central section 62 is wider than a second end 153. Accordingly, when the waveguide 160 is compressed by an axial force F, the grating 56 is quadradically chirped, and thereby changes the shape of the filter profile 24 (FIG. 4) of the grating 56 accordingly. Similarly, a thermal device 154 may be wrapped around the central section 62 of the waveguide 160 to tune the center (or reflection) wavelength of the grating 56 along a spectral range.

Further in FIG. 12, the central portion 62 of the waveguide 170 may be tapered in a stepped fashion, such that a first end 152 of the central section 62 is wider than a second end 153. Accordingly, when the waveguide 170 is compressed by an axial force F, the grating 56 is linearly tuned at discrete locations along the central section 62, and thereby changes the shape of the filter profile 24 (FIG. 4) of the grating 170 accordingly. Similarly, a thermal device 154 (e.g., heater TEC or any heating or cooling device) may be wrapped around the central section 62 of the waveguide 170 to tune the center (or reflection) wavelength of the grating along a spectral range.

Figure 13:
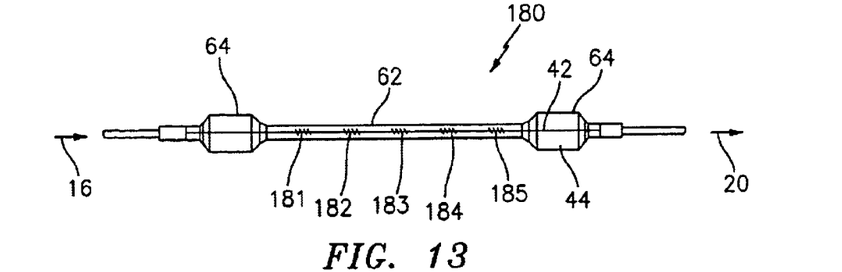
FIG. 13 is a side view of another embodiment of an optical waveguide of a gain flattening filter including plurality of concatenated blazed Bragg gratings written therein, in accordance with the present invention.

Referring to FIGS. 7 and 13, as discussed hereinbefore, a single Bragg grating 56 in the core 42 of the waveguide 40 is written therein to provide a particular filter profile 24 (FIG. 4) to flatten or change the gain profile of an optical signal (e.g., amplified signal 16). The filter profile can be characterized using a plurality of filter profiles defining components in a Fourier series. Alternatively, the filter profile may be written as a single periodic grating or aperiodic grating, such as a chirped grating.

Accordingly, the single Bragg grating 56 may be written as a plurality of concatenated periodic and/or aperiodic gratings 181–185 spaced along the core 42 of the central section 62 of a waveguide 180 as shown in FIG. 13, wherein each grating is representative of a component of the Fourier series defining the desired filter profile. The gratings 181–185 may be written into the core 42 at an oblique angle relative to the axis of the core to reflect the filtered signal into the cladding 44 of the waveguide 180 and pass the output signal 20. Bragg gratings written at an oblique angle are known in the art as blazed gratings (see, e.g. U.S. Pat. No. 5,337,382, entitled "Article Comprising an Optical Waveguide with In-line Refractive Index Grating"; U.S. Pat. No. 5,042,897, entitled "Optical Waveguide Embedded Light Redirecting Bragg Grating Arrangement"; and U.S. Pat. No. 5,061,032 "Optical Waveguide Embedded Light Redirecting and Focusing Bragg Grating Arrangement", which are incorporated herein by reference.

While the blazed grating described in the embodiment hereinbefore are written in a photosensitive core, another embodiment provides writing the blazed grating (concatenated or single grating) in the waveguide having a photosensitive cladding and a core having a lower photosensitivity than the cladding to prevent coupling to backward propagating core modes. The resulting waveguide has the blaze grating written in the cladding and the core, wherein the strength of the grating in the cladding is much greater than that of the core. The waveguide may also be soaked in high pressure hydrogen prior to writing the grating to increase its photosensitivity.

To provide the desired levels of photosensitivity in the waveguide, the core may include Germanium, which is photosensitive, and Phosephorus, which is known to not exhibit photosensitivity when exposed to 244 or 248 nm light, but does raise the index of refraction of the core. Further, the cladding of the waveguide may include Germanium to provide a photosensitive cladding and Boron to depress the index of refraction of the cladding. In the cladding, the germanium boron combination provides excellent photosensitivity, especially when hydrogen loaded, but the pair of elements if used in the correct proportion can produce a glass composition whose index of refraction is the same as pure silica or lower.

It is also contemplated that the core is formed to have substantially not photosensitivity, while the cladding is photosensitive. Consequently, only the cladding will have a grating and the core will have no gratings written therein.

Further, it is also contemplated by the present invention that the concatenated gratings 181–185 of FIG. 13 may also be written in an optical waveguide having a non-uniform central portion, similar to that described in FIGS. 10–12.

Figure 14:
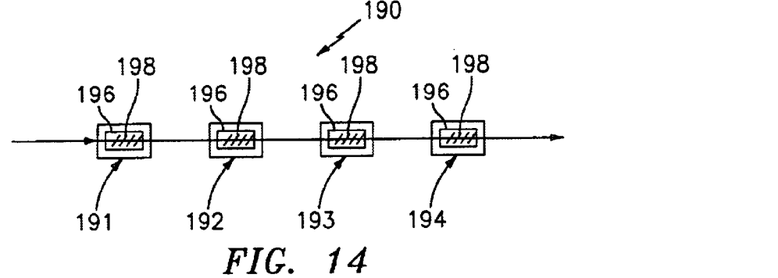
FIG. 14 is a graphical representation illustrating a distributed tunable gain flattening filter operating in a transmission mode, in accordance with the present invention.

FIG. 14 shows another embodiment of a GFF 190 operating in a transmission mode that includes a plurality of tunable devices 191–194 (i.e., a tuning device 100 and/or athermal device 70) optically coupled in series. Each tunable device includes a waveguide 196 with a periodic and/or aperiodic grating 198 written therein. Similar to that described in FIG. 13, each grating is blazed and represents a component of the Fourier series defining the desired filter profile. Accordingly, each grating 198 may be independently tuned, either statically or dynamically, to provide any desired filter profile for the GFF 190.

Figure 15:
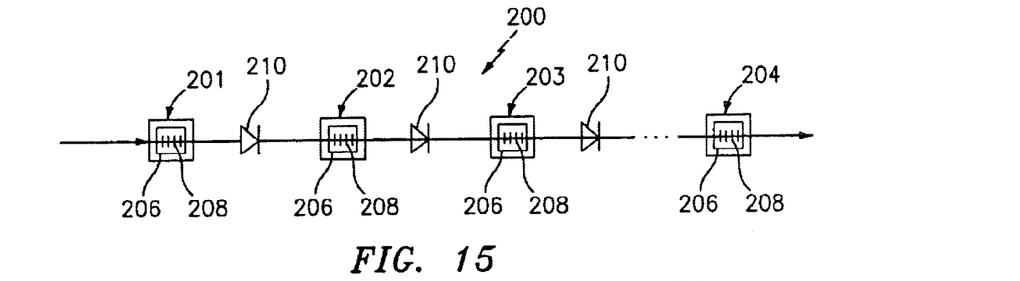
FIG. 15 is a graphical representation illustrating another embodiment of the distributed tunable gain flattening filter operating in the transmission mode, in accordance with the present invention.

Similar to the GFF 190 of FIG. 14, another embodiment of a GFF 200 illustrated in FIG. 15 operates in a transmission mode and includes a plurality tunable devices 201–204 optically coupled in series. Each tunable device 201–204 includes a waveguide 206 with a periodic and/or aperiodic grating 208 written therein. However, each grating 208 is not blazed, but is written in the core 42 perpendicular to the axis of the core, wherein each grating represents a component of the Fourier series defining the desired filter profile. An optical isolator 210 is disposed between each of the tunable devices 201–204 to prevent the oscillation of light between gratings, which may have overlapping reflection wavelengths. Accordingly, each grating 208 may be independently tuned, either statically or dynamically, to provide any desired filter profile for the GFF 200.

Figure 16:
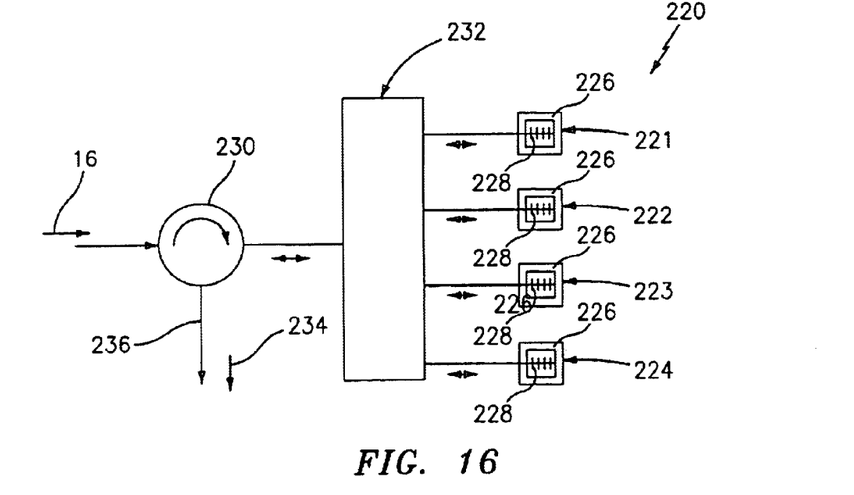
FIG. 16 is a graphical representation illustrating a distributed tunable Bragg grating gain filter operating in a reflection mode, in accordance with the present invention.

Referring to FIG. 16, another embodiment of a GFF 220 is shown that operates in a reflection mode that includes a plurality of tunable devices 221–224, each of which includes a waveguide 226 with a periodic and/or aperiodic grating 228 written therein. Each grating 228 represents a component of the Fourier series defining the desired filter profile. A 3-port circulator 230 provides an optical signal (e.g. amplified signal 16) to a coupling device (e.g., multiplexer/demultiplexer), which provides the amplified signal 16 to each of the tunable devices 221–224. The coupling device 232 then receives and combines the signals reflected back from the waveguides 226 and provides the combined output signal to the circulator 230, which directs the output signal 234 to output fiber 236.

Figure 17:
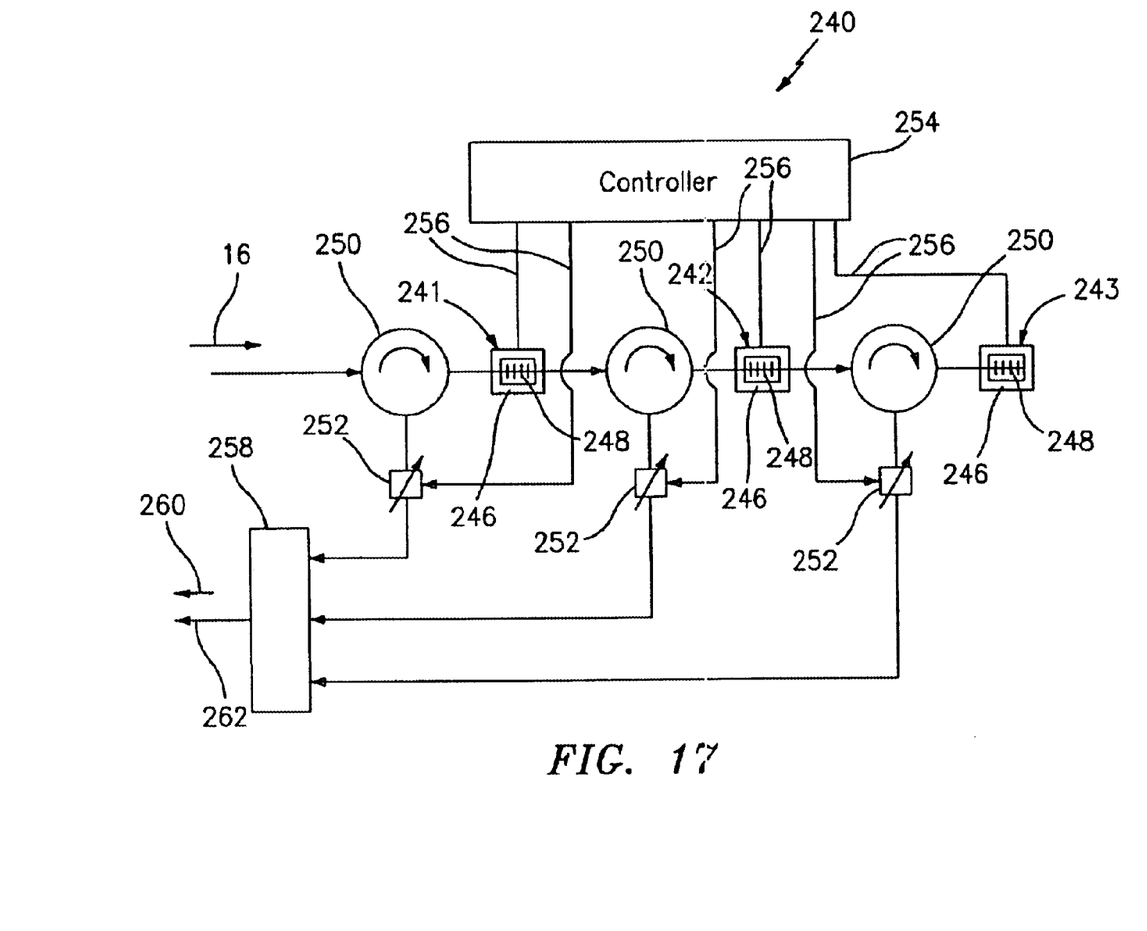
FIG. 17 is a graphical representation illustrating another embodiment of the distributed tunable gain flattening filter operating in the reflection mode, in accordance with the present invention.

In FIG. 17, anther embodiment of a GFF 240 is illustrated. The GFF 240 includes a plurality of tunable devices 241–243, each of which includes a waveguide 246 with a periodic and/or aperiodic grating 248 written therein. Each grating 248 represents a component of the Fourier series defining the desired filter profile. The tunable devices 241–243 are optically connected in series with a respective circulator 250 disposed before each tunable device. Each circulator 250 functions to direct an optical signal to each respective tunable device 241–243 and direct a reflected optical signal from each tunable device to a respective variable attenuator 252. Each tunable device reflects a portion of the optical signal (e.g. amplified signal 16) and passes the remaining wavelengths to the next tunable device. A controller 254 generates controls signals at 256 to tune each tunable device and each variable attenuator 252 in accordance with a desired filter profile. The ability to independently vary the reflection of each grating 248 and the gain of each reflected signal provides the capability to dynamically create a desired filter profile for the GFF 240. The output signal of each attenuator 252 is then provided to a coupler 258 (e.g., star coupler), which combines the output signals of each attenuator and output the combined signal 260 to fiber 262. Advantages of the present invention include:

Advantageously, the present invention provides easy athermalization, simple fabrication, cheaper fabrication costs, a rugged design, no requirement for a power source required, minimal insertion loss in the optical system, and requires no active control elements, yet enables a wide spectral flattening range.

One will appreciate that although the present invention has been described as a filter to flatten the gain of an amplified signal, the present invention may filter or attenuate any optical signal to provide an output signal having any desired spectral profile.

The dimensions and geometries for any of the embodiments described herein are merely for illustrative purposes and, as much, any other dimensions may be used if desired, depending on the application, size, performance, manufacturing requirements, or other factors, in view of the teachings herein.

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein without departing from the spirit and scope of the present invention.

What is claimed is:

1. An optical filter comprising:
   an optical waveguide having outer dimensions along perpendicular longitudinal and transverse directions, the waveguide including:
   an outer cladding having a core disposed therein, wherein a filter portion of the waveguide having an outer dimension in the transverse direction is greater than 0.3 mm; and
   a slanted grating imparted in the filter portion of the waveguide for selectively attenuating a received optical input signal to provide an optical output signal having a desired filter profile;
   at least a portion of the filter portion of the waveguide having a transverse cross-section that is continuous and comprises substantially the same material;

wherein the slanted grating is longitudinally strain compressed so as to change the filter profile without buckling the waveguide in the transverse direction thereby tuning the optical filter.

2. The optical filter of claim 1, wherein the slanted grating is disposed substantially in only the cladding.

3. The optical filter of claim 1, wherein the slanted grating is disposed substantially in only the core.

4. The optical filter of claim 1, wherein the slanted grating is disposed in both the core and the cladding.

5. The optical filter of claim 1, wherein the core and cladding are photosensitive, whereby the photosensitivity of the cladding is greater than the photosensitivity of the core.

6. The optical filter of claim 1, wherein the core and cladding are photosensitive, whereby the photosensitivity of the core is greater than the photosensitivity of the cladding.

7. The optical filter of claim 1, wherein the slanted grating is a Bragg grating.

8. The optical filter of claim 1, wherein the slanted grating is aperiodic.

9. The optical filter of claim 1, wherein the slanted grating is chirped.

10. The optical filter of claim 1, wherein the slanted grating is periodic.

11. The optical filter of claim 1, wherein the slanted grating includes a plurality of concatenated slanted gratings.

12. The optical filter of claim 1, wherein the slanted grating provides a filter profile to flatten the gain of an input optical signal.

13. The optical filter of claim 1, wherein the dimension in the transverse direction of the outer cladding is a predetermined value, said value being about 0.3 mm, 0.4 mm, 0.5 mm, 0.6 mm, 0.7 mm, 0.8 mm, 0.9 mm, 1.0 mm, 1.2 mm, 1.4 mm, 1.6 mm, 1.8 mm, 2.0 mm, 2.1 mm, 2.3 mm, 2.5 mm, 2.7 mm, 2.9 mm, 3.0 mm, 3.3 mm, 3.6 mm, 3.9 mm, 4.0 mm, 4.2 mm, 4.5 mm, 4.7 mm, or 5.0 mm.

14. The optical filter of claim 1, wherein the dimension in the longitudinal direction of the outer cladding is a predetermined value, said value being about 3 mm, 5 mm, 7 mm, 9 mm, 10 mm, 12 mm, 14 mm, 16 mm, 18 mm, 20 mm, 21 mm, 23 mm, 25 mm, 27 mm, 29 mm, 30 mm, 32 mm, 34 mm, 36 mm, 38 mm, 40 mm, 45 mm, 50 mm, 55 mm, 60 mm, 65 mm, 70 mm, 75 mm, 80 mm, 85 mm, 90 mm, 95 mm, or 100 mm.

15. The optical filter of claim 1, wherein the dimension in the transverse direction of the outer cladding is greater than a predetermined value, said value being about 0.3 mm, 0.4 mm, 0.5 mm, 0.6 mm, 0.7 mm, 0.8 mm, 0.9 mm, 1.0 mm, 1.2 mm, 1.4 mm, 1.6mm, 1.8 mm, 2.0 mm, 2.1 mm, 2.3 mm, 2.5 mm, 2.7 mm, 2.9 mm, 3.0 mm, 3.3 mm, 3.6 mm, 3.9 mm, 4.0 mm, 4.2 mm, 4.5 mm, 4.7 mm, or 5.0 mm.

16. The optical filter of claim 1, wherein the dimension in the longitudinal direction of the outer cladding is greater than a predetermined value, said value being about 3 mm, 5 mm, 7 mm, 9 mm, 10 mm, 12 mm, 14 mm, 16 mm, 18 mm, 20 mm, 21 mm, 23 mm, 25 mm, 27 mm, 29 mm, 30 mm, 32 mm, 34 mm, 36 mm, 38 mm, 40 mm, 45 mm, 50 mm, 55 mm, 60 mm, 65 mm, 70 mm, 75 mm, 80 mm, 85 mm, 90 mm, 95 mm, or 100 mm.

17. An optical filter comprising:
an optical waveguide having outer dimensions along perpendicular longitudinal and transverse directions, the waveguide including:
an outer cladding having a core disposed therein, wherein a filter portion of the waveguide having an outer dimension in the transverse direction is greater than 0.3 mm; and
a reflective element imparted in the core of the filter portion of the waveguide for selectively attenuating a received optical input signal to provide an optical output signal having a desired filter profile,
wherein a dimension of the filter portion of the waveguide in the longitudinal direction is greater than 3 mm and less than a buckling length for a predetermined value of said outer dimension of the outer cladding in the transverse direction and a predetermined axial compressive strain.

18. The optical filter of claim 17, wherein said core has an outer core dimension of less than about 12.5 microns.

19. The optical filter of claim 17, wherein said core propagates light in substantially a single spatial mode.

20. The optical filter of claim 17, wherein said reflective element comprises a Bragg grating.

21. The optical filter of claim 17 wherein at least a portion of said waveguide has a cylindrical shape.

22. The optical filter of claim 17 wherein said core comprises a circular end cross-sectional shape.

23. The optical filter of claim 17 wherein said core comprises an asymmetrical cross-sectional shape.

24. The optical filter of claim 17 wherein said waveguide has a shape that provides a predetermined sensitivity to a length of said wavelength due to a change in axial force on said waveguide.

25. The optical filter of claim 24 wherein said shape of said waveguide comprises a dogbone shape.

26. The optical filter of claim 24, wherein the waveguide includes a first end having a first cross section, an opposing second end having a second cross section, and an intermediate section located between the first and second ends having a third cross section smaller than the first and second cross sections, and wherein the reflective elements is imparted in the core of the optical device within the intermediate section of the waveguide.

27. The optical filter of claim 17, wherein the reflective element comprises an aperiodic weak Bragg grating.

28. The optical filter of claim 17, wherein the reflective element comprises a periodic weak Bragg grating.

29. The optical filter of claim 17, wherein the reflective element comprises a plurality of blazed gratings for selectively reflecting the received optical signal at different wavelengths over a spectral range.

30. The optical filter of claim 17, further comprising:
a tuning device for tuning the reflective element of the waveguide by exerting an axial force on the waveguide.

31. The optical filter of claim 30, wherein the tuning device is responsive to temperature.

32. The optical filter of claim 30, wherein the tuning device is responsive to a control signal.

33. The optical filter of claim 30, wherein the tuning device includes an actuator to compress the waveguide in response to a control signal.

34. The optical filter of claim 31 wherein the tuning device includes a spacer for compressing the waveguide to compensate for spectral shift of the reflective element in response to a temperature change.

35. The optical filter of claim 26, wherein the cross section of the intermediate section of the waveguide is uniform.

36. The optical filter of claim 26, wherein the cross section of the intermediate section of the waveguide is non-uniform.

37. The optical filter of claim 26, wherein the cross section of the intermediate section of the waveguide is tapered to provide the non-uniform cross section.

38. The optical filter of claim 26, wherein the cross section of the intermediate section of the waveguide has a step-wise shape for providing the non-uniform cross section.

39. The optical filter of claim 17, further comprising an optical directing device for redirecting the reflected optical signal to a light conduit.

40. The optical filter of claim 17, wherein the reflective element includes a plurality of Bragg gratings distributed over a section of the core.

41. The optical device of claim 17, wherein the reflective element includes a slanted grating imparted in the waveguide.

* * * * *